United States Patent [19]

Relvini et al.

[11] Patent Number: 5,637,662
[45] Date of Patent: Jun. 10, 1997

[54] PROCESS FOR THE CONTINUOUS BULK PRODUCTION OF ACRYLIC POLYMERS

[75] Inventors: Pasquale Relvini; Fortunato Airaghi, both of Milan, Italy

[73] Assignee: Atochem Industriale s.r.l., Milan, Italy

[21] Appl. No.: 361,897

[22] Filed: Dec. 22, 1994

Related U.S. Application Data

[63] Continuation of Ser. No. 248,843, May 25, 1994, abandoned, which is a continuation of Ser. No. 977,722, Nov. 16, 1992, abandoned, which is a continuation of Ser. No. 701,904, May 17, 1991, abandoned.

[30] Foreign Application Priority Data

May 18, 1990 [IT] Italy ................... 20378A090

[51] Int. Cl.$^6$ .................. C08F 2/00; C08F 220/14; C08F 220/18
[52] U.S. Cl. ............ 526/213; 526/329.7; 526/328
[58] Field of Search .................. 526/213, 329.7, 526/328

[56] References Cited

U.S. PATENT DOCUMENTS

| 3,637,545 | 1/1972 | Fivel . | |
| 4,529,787 | 7/1985 | Schmidt et al. | 526/317 |
| 4,777,230 | 10/1988 | Kamath | 526/86 |
| 4,877,853 | 10/1989 | Siol et al. | 526/329.7 |

FOREIGN PATENT DOCUMENTS

| 319622 | 6/1989 | European Pat. Off. . |
| 2461164 | 6/1976 | Germany . |
| 55-007815 | 2/1980 | Japan . |
| 55-007845 | 2/1980 | Japan . |

OTHER PUBLICATIONS

Hawley's Condensed Chemical Dictionary, 11th ed., 1987; p. 762; Van Nostrand Reinhold, New York.
Principles of Polymerization Engineering, J.A. Biesenberger and D.H. Sebastian, Stevens Institute of Technology, A Wiley–Interscience Publication.
The Condensed Chemical Dictionary, Ninth Edition, Von Nostrand Reinhold Company, pp. 288 and 360.
Chem. Abstr. vol. 112, No. 6, Feb. 5, 1990 No. 36780z.
James E. Mark and George Odian, ACS Short Course on Polymer Chemistry, p. 172 [American Chemical Society].
James L. Throne "Plastics Process Engineering" pp. 99, 1979.

*Primary Examiner*—Joseph L. Schofer
*Assistant Examiner*—Wu C. Cheng

[57] ABSTRACT

This invention relates to a process for the continuous bulk production of acrylic polymers which comprises:

a. continuously feeding a polymerization reactor with a reaction mixture containing at least a polymerization adjuvant selected from solvents of the acrylic polymer, preferably from the $C_1$–$C_{10}$ alkyl esters of organic acids R—COOH, wherein radical R represents a hydrogen atom or an alkyl radical containing from 1 to 6 carbon atoms, b. partially converting the reaction mixture at high temperature, and c. devolatilizing the partially converted polymer at high temperature and reduced pressure.

9 Claims, No Drawings

PROCESS FOR THE CONTINUOUS BULK PRODUCTION OF ACRYLIC POLYMERS

This is a continuation of application Ser. No. 08/248,843, filed on May 25, 1994 now abandoned, which is a continuation of application Ser. No. 07/977,722, filed on Nov. 16, 1992 now abandoned, which is a continuation of application Ser. No. 07/701/904, filed on May 17, 1991, now abandoned.

FIELD OF THE INVENTION

The present invention concerns a process for the continuous bulk production of acrylic polymers.

BACKGROUND OF THE INVENTION

The term "acrylic polymers", whenever used in the present specification and in the claims, means the homopolymers and the copolymers of the alkyl esters of the acrylic or methacrylic acid wherein the alkyl group contains from 1 to 8 carbon atoms.

Examples of acrylic or methacrylic acid esters are: methylacrylate, ethylacrylate, isopropylacrylate, butylacrylate, methyl methacrylate, isopropyl methacrylate, sec.butyl methacrylate, ter.butyl methacrylate, etc.

The acrylic polymers can also contain up to 50% by weight of units derived from other monomers containing double bonds such as styrene, alpha-methylstyrene, acrylonitrile, (met)acrylamide, n-alkyl maleimides or aryl maleimides etc., or from double-unsaturation monomers such as, for example, butadiene.

The production of acrylic polymers such as, for example, polymethyl methacrylate (PMMA), is generally obtained by means of a discontinuous process in an aqueous suspension.

The reaction occurs in stirred reactors wherein there are introduced the monomer additioned with a radical starter and the aqueous phase containing a suspending agent, which has the purpose to prevent the caking of the polymer which gradually forms.

The polymerization heat is removed through the aqueous phase, so permitting to control the reaction which proceeds until a practically complete conversion of the monomer has occurred. The polymer in the form of beads is separated by contrifugation from the reaction mixture and then it is washed and dried. The PMMA beads are fed to an extruder in order to obtain granules and plates.

The suspension polymerization technology, owing to the type of utilized additives and to the sequence of involved operations, which cannot be integrated in a continuous process, unavoidably gives rise to polymer contaminations which are accompanied by a worsening of the excellent intrinsic optical properties of the PMMA. Such worsening, which seems to scarcely affect the usual applicative requirements, precludes, conversely, the use of the polymer in emerging sectors such as the one of the optical fibers, laser scanning discs and optical instruments in general. The main causes of the optical pollution of the polymer are:

the suspending agent, which remains incorporated in the polymer in little amounts, giving rise to yellowing and loss of transparency;

the high molecular weight polymer fractions, which are apparent in the manufactured articles in the form of microgels, the formation of which is bound to non-homogeity phenomena of the suspension and to the formation of agglomerates and scales in the reactors;

the foreign particles, which infiltrate in the production flow due to the process discontinuity.

These contamination causes can be removed by using a bulk polymerization process, as is described, for example, in laid-open Japanese patent applications 59/45,310; 59/48, 121; 58/88,701, 58/88,702 and 50/34,071, which provides polymers starting from a homogeneous mixture consisting of a monomer containing little amounts of a radical polymerization starter and of a molecular weight modifier, without using other auxiliary materials (for example dispersants). Such system permits to integrate in a single continuous process all the steps, from the ones preceding the polymerization up to extrusion of the polymer in the form of granules or plates, thereby minimizing the risks of infiltrations of foreign particles and sensibly reducing the operating costs.

The obstacles to be overcome for conducting a continuous bulk polymerization process are mainly due to an increase in the reaction mixture viscosity as the monomer is converted into polymer, what involves:

difficulty in stirring, feeding and discharging the reacting mass;

difficulty in dissipating the reaction heat and therefore in thermally controlling the reaction;

acceleration of the polymerization rate due to a decrease in the termination rate of the macroradicals and to the consequent increase in the concentration of active species in the reaction mixture; this phenomenon, which is designated as "gel-effect or self-acceleration", gives rise to a higher heat generation in the unit of time.

DESCRIPTION OF THE INVENTION

The Applicant has now found a continuous process for the production of acrylic polymers, by polymerization in a homogeneous phase, which permits to overcome the above-cited critical points and to obtain a polymer having constant characteristics and a high quality, particularly as regards the optical properties.

Thus, it is an object of the present invention to provide a process for the continuous bulk production of acrylic polymers, which comprises:

a. continuously feeding a polymerization reactor with a reaction mixture containing at least a polymerization adjuvant selected from the solvents of the acrylic polymer, preferably from the $C_1$–$C_{10}$ alkyl esters of organic acids R—COOH, wherein radical R represents a hydrogen atom or an alkyl radical containing from 1 to 6 carbon atoms;

b. partially converting the reaction mixture at high temperature; and c. devolatilizing the partially converted polymer at high temperature and preferably reduced pressure.

In the process object of the present invention, the polymerization reactor is preferably of the tubular type and is equipped in the inside with cooling surfaces in order to exchange the polymerization heat which gradually liberates.

The polymerization reactor is continuously fed with the reacting mixture, which comprises at least an acrylic monomer of the above-mentioned type, optionally in admixture with other monomers containing double bonds, a polymerization radical starter, a molecular weight modifier and the processability adjuvant.

The polymerization radical starter is utilized in amounts ranging from 0.001 to 0.1% by weight on the total of the reacting mixture, and it is selected from those products, which have a half time at 130° C. lower than 3 hours and generally ranging from 0.3 to 2 hours.

Examples of radical starters which are utilizable in the process of the present invention are the peroxide starters such as di-tert.butyl peroxide, tert. butylperoxybenzoate, dicumyl peroxide, 2,5-dimethyl-2,5-bis(tert.butylperoxy)-hexane, bis(tert. butylperoxyisopropyl)benzene, etc.

The molecular weight modifier is utilized in amounts ranging from 0.1 to 1% by weight calculated on the total, and it is selected from the mono or difunctional mercaptans of formula $R_1$—$(SH)_m$, wherein $R_1$ represents an alkyl radical, a cycloalkyl radical, a $C_1$-$C_{20}$ aromatic radical and m is an integer from 1 to 2, or of formula:

$$(SH—R_2—COO)_n R_3$$

where $R_2$ and $R_3$ represent a $C_1$-$C_{10}$ alkyl radical and n is an integer ranging from 1 to 4.

Examples of molecular weight modifiers are n-butylmercaptane, n-dodecylmercaptane, tert. dodecylmercaptane, cyclohexylmercaptane, n-octylmercaptane, 2-ethylhexyl-3-mercaptopropionate, etc.

The polymerization adjuvant is contained in the mixture fed to the reactor in amounts ranging from 5 to 30% by weight, preferably from 15 to 25%. Examples of polymerization adjuvants according to the present invention are: n-butylformate, n-butylacetate, isobutylacetate, tert. butylacetate, ethylpropionate, methyl butyrate, ethyl isobutyrate, methyl hexanoate, etc.

In the reactor inside the temperature is maintained at high values, of about 120°–160° C., in order to keep in an acceptable range the viscosity of the monomer-polymer solution and to reduce or to shift towards higher conversions the begin of the self-acceleration, while the pressure is maintained at values ranging from the mixture vapor tension to 0.5 MPa.

Once a monomer conversion degree of about 70–90% has been obtained, the reaction mixture is taken out from the reactor and is conveyed to a devolatilization device operating at a temperature ranging from 200° to 250° C. and at a pressure ranging from room temperature to $10^3$ Pa.

From the devolatilization device the polymer, in the molten state, is sent to a die in order to obtain granules, or to an extrusion head to obtain plates.

The volatile components extracted from the devolatilization device and substantially consisting of unreacted monomers and of the polymerization adjuvant, are recycled to the reactor.

When the polymer prepared by the process of the present invention consists of PMMA or of a methylmethacrylate copolymer containing for example up to 25% by weight of another acrylic monomer, the product exhibits the following optical properties:

Transmittance (ASTM D 1003-61): higher than 92% on 3 mm thick specimens;

Haze (ASTM D 1003-61): lower than 0.5% on 3 mm thick specimens;

Yellow index (ASTM D 1925-70): lower than 2.5 on 60 mm thick specimens.

EXAMPLES

For a better understanding of the present invention and for carrying it into practice, illustrative but not limiting examples are given hereinafter.

Example 1

There was prepared a mixutre consisting of:

| | |
|---|---|
| methyl methacrylate | 74 parts by weight |
| methyl acrylate | 6 parts by weight |
| n-butylacetate | 20 parts by weight |
| n-dodecanethiol | 0.2 parts by weight |
| di-tert.butylperoxide | 0.003 parts by weight. |

After removal of the dissolved oxygen by means of a nitrogen flow, the mixture was continuously fed, at a flowrate of 25 l/h, to a vertical tubular reactor of 20 l volume, inside equipped with horizontal rows of tubes for the heat exchange.

Between a row and the other, the stirrer blades were rotating at a speed adjusted at 50 r.p.m.

The mixture shifted with a piston-like flow from the top to the bottom and the residence time was of 8 hours.

The reactor inner temperature was adjusted at 120° C. and the pressure at 300 KPa by letting in nitrogen.

The mixture left the reactor at a polymer concentration of 65%, corresponding to a conversion of 80%, and was fed by means of a gear pump to the devolatilization section consisting of a heat exchanger directly arranged in an evaporation chamber maintained at reduced pressure.

The polymer was devolatilized at 240° C. and at a pressure of 3 KPa.

The vapors evolving inside the chamber and consisting of the unreacted monomers and of n-butylacetate, were made to flow to the condensation system, then they were mixed with the fresh monomers, the polymerization starter, the chain transferor, whereafter they were sent again to the polymerization reactor.

The polymer was drawn from the bottom of the devolatilization device by means of a gear pump, it was sent to a die and converted into granules. The die temperature was of 240° C.

There were obtained 16 kg/h of polymer having a content of volatile compounds (residual monomers and n-butylacetate), determined by gas chromatography, lower than 0.3%.

The other characteristics were the ones of an excellent polymethylmethacrylate suitable for extrusion:

| | |
|---|---|
| Vicat softening point<br>4.9 N, ISO method 306 | 105° C. |
| Melt flow index<br>230° C./3.8 kg, ISO method 1133 | 1.5 g/10$^1$ |
| Light transmission (400–900 nm)<br>specimen thickness = 3 mm, method<br>ASTM D 1003-61 | >92% |
| Haze<br>specimen thickness = 3 mm, method<br>ASTM D 1003-61 | 0.4% |
| Yellow index<br>specimen thickness = 60 mm, method<br>ASTM D 1925-70 | 2.0 |

Furthermore the granule was extruded in the form of a plane plate, so obtaining a product with excellent aesthetic characteristics and free from surface defects (gels).

After a 500-hour continuous operation, no significant sticking or accmulation of polymer on the walls of the apparatus and in the tubes was observed.

Example 2

Using the apparatuses and the general operative modalities described in example 1, the polymerization reactor was fed with a mixture consisting of:

| | |
|---|---|
| methyl methacrylate | 78.5 parts by weight |
| methyl acrylate | 1.5 parts by weight |
| isobutyl acetate | 20 parts by weight |
| n-dodecathiol | 0.2 parts by weight |
| 2,5-dimethyl-2,5-bis(tert.butyl-peroxy)hexane | 0.004 parts by weight |

The polymerization temperature was adjusted at 120° C., the pressure at 300 KPa and the residence time at 6.5 hours.

The mixture left the reactor at a polymer concentration of 65%, corresponding to a conversion of 80%, then it was devolatilized at 240° C. and at 3 KPa. The die was maintained at 240° C.

There were obtained 20 kg/h of polymer in granules suitable for extrusion, having a content of residual monomers and of isobutyl acetate lower than 0.3% in the aggregate.

The other characteristics are given hereinafter:

| | |
|---|---|
| Vicat softening point<br>4.9 N, ISO method 306 | 110° C. |
| Melt flow index<br>230° C./3.8 kg, ISO method 1133 | 1 g/10$^1$ |
| Light transmission (400–900 nm)<br>specimen thickness: 3 mm, method ASTM D 1003-61 | >92% |
| Haze<br>specimen thickness: 3 mm, method ASTM D 1003-61 | 0.3% |
| Yellow index<br>specimen thickness: 60 mm, method ASTM D 1925-70 | 1.8 |

The granule was extruded at 250° C. in the form of double-wall plates (insulating plates); the product so obtained exhibited excellent aesthetical characteristics.

After a 500-hour continuous operation, no polymer was found to stick to the surfaces of the utilized apparatus.

Example 3

Using the apparatus and following the general operative modalities described in example 1, the polymerization reactor was fed with a mixture consisting of:

| | |
|---|---|
| methyl methacrylate | 74 parts by wt. |
| methyl acrylate | 6 parts by wt. |
| ethyl propionate | 20 parts by wt. |
| 2-ethylhexyl-3-mercapto-propionate | 0.4 parts by wt. |
| dicumylperoxide | 0.01 parts by wt. |

The polymerization temperature was adjusted at 120° C., the pressure at 300 KPa and the residence time at 5.5 hours.

The mixture left the reactor at a polymer concentration of 60%, corresponding to a conversion of 75%, and it was then devolatilized at 230° C. and at 3 KPa. The die was maintained at 230° C.

There were obtained 21.8 kg/h of polymer in granules suitable for injection molding, with a content of residual monomers and of ethyl propionate lower than 0.2% in the aggregate.

The other characteristics were as follows:

| | |
|---|---|
| Vicat softening point<br>4.9 N, ISO method 306 | 105° C. |
| Melt flow index<br>230° C./3.8 kg, ISO method 1133 | 4.5 g/10$^1$ |
| Light transmission (400–900 nm)<br>specimen thickness: 3 mm, ASTM method D 1003-61 | >92% |
| Haze<br>specimen thickness: 3 mm, ASTM method D 1003-61 | 0.4% |
| Yellow index<br>specimen thickness: 60 mm, ASTM method D 1925-70 | 2.2 |

After a 500-hour continuous operation no polymer scales in the utilized apparatus were found.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A process for the preparation of optical fibers and optical instruments by molding or extrusion of polymethyl methacrylate or of a methylmethacrylate copolymer containing up to 25% by weight of another $C_1$–$C_8$ alkyl ester of (meth)acrylic acid having a transmittance greater than 92%, a haze less than 0.5% and a yellow index less than 2.5, the transmittance and haze being determined on 3 mm thick specimens according to A.S.T.M. D 1003-61 and, the yellow index on 60 mm thick specimens according to A.S.T.M. D1925-70, obtained by a process comprising:

a. continuously feeding a polymerization reactor with a reaction mixture consisting essentially of methylmethacrylate or methylmethacrylate with another $C_1$–$C_8$ alkyl(meth) acrylate, from 0.001 to 0.1% by weight of a polymerization radical starter, a molecular weight modifier, and from 5 to 30% by weight of a polymerization adjuvant selected from the group consisting of n-butylformate, n-butylacetate, isobutylacetate, tert.butylacetate, ethylpropionate, methylbutyrate, ethylbutyrate and methylhexanoate;

b. partially converting the reaction mixture at about 120° C. to 160° C., and at a pressure ranging from the mixture vapor tension to 0.5 MPa; and c. devolatilizing the partially converted polymer at about 200° C. to 250° C.;

wherein the viscosity of the reaction mixture is maintain in a range to avoid self-acceleration.

2. A process for the preparation of optical fibers and optical instruments comprising the steps of:

(a) continuously feeding a polymerization reactor with a reaction mixture consisting essentially of methylmethacrylate or methylmethacrylate with up to 25% by weight of another $C_1$–$C_8$ alkyl(meth) acrylate, from 0.001 to 0.1% by weight of a polymerization radical starter , a molecular weight modifier, and from 5 to 30% by weight of a polymerization adjuvant solvent selected from the group consisting of n-butylformate, n-butylacetate, isobutylacetate, tert.butyl-acetate, ethylpropionate, methylbutyrate, ethylbutyrate, and methylhexanoate;

(b) partially converting about 70 to 90% of the reaction mixture at about 120° C. to 160° C., and at a pressure ranging from the mixture vapor tension to 0.5 MPa;

(c) devolatilizing the partially converted polymer at about 200° to 250° C.;

(d) sending the devolatilized polymer in a molten state to a molding device or an extruding device; and (e) making a molded or extruded product having a transmittance greater than 92%, a haze less than 0.5% and a yellow index less than 2.5, the transmittance and haze being determined on 3 mm thick specimens according to A.S.T.M. D 1003-61, and the yellow index being determined on 60 mm thick specimens according to A.S.T.M. D1925-70;

wherein the viscosity of the reaction mixture is maintain in a range to avoid self-acceleration.

3. The process of claim 2, wherein the polymer devolatilization is carried out at a pressure from atmospheric pressure to $10^3$ pa.

4. The process of claim 2 wherein the molecular weight modifier is present in an amount ranging from 0.1 wt % to 1.0 wt %.

5. A process for the preparation of optical fibers and optical instruments by molding or extrusion of polymethyl methacrylate or of a methylmethacrylate copolymer containing up to 25% by weight of another $C_1$–$C_8$ alkyl ester of (meth) acrylic acid having a transmittance greater than 92%, a haze less than 0.5% and a yellow index less than 2.5, the transmittance and haze being determined on 3 mm thick specimens according to A.S.T.M. D 1003-61 and, the yellow index on 60 mm thick specimens according to A.S.T.M. D1925-70, obtained by a process comprising:

a. continuously feeding a polymerization reactor with a reaction mixture comprising methylmethacrylate or methylmethacrylate with another $C_1$–$C_8$ alkyl(meth) acrylate, from 0.001 to 0.1% by weight of a polymerization radical starter which have a half-life at 130° C. between 0.3 to 3 hours, a molecular weight modifier selected from the mono or difunctional mercaptans of formula $R_1$—$(SH)_m$, wherein $R_1$ represents an alkyl radical, a cycloalkyl radical, a $C_1$–$C_{20}$ aromatic radical and m is an integer from 1 to 2 or of formula (SH—$R_2$—COO)$_n R_3$, where $R_2$ and $R_3$ represent a $C_1$–$C_{10}$ alkyl radical and n is an integer ranging from 1 to 4 and from 5 to 30% by weight of a polymerization adjuvant selected from the group consisting of n-butylformate, n-butylacetate, isobutylacetate, tert.butyl-acetate, ethylpropionate, methylbutyrate, ethylbutyrate, and methylhexanoate;

b. partially converting the reaction mixture at about 120° C. to 160° C., and at a pressure ranging from the mixture vapor tension to 0.5 MPa; and c. devolatilizing the partially converted polymer at about 200° C. to 250° C. and at a pressure ranging from atmospheric to $10^3$ Pa;

wherein the viscosity of the reaction mixture is maintain in a range to avoid self-acceleration.

6. A process for the preparation of optical fibers and optical instruments comprising the steps of:

(a) continuously feeding a polymerization reactor with a reaction mixture comprising methylmethacrylate or methylmethacrylate with up to 25% by weight of another $C_1$–$C_8$ alkyl(meth)acrylate, from 0.001 to 0.1% by weight of a polymerization radical starter which have a half-life at 130° C. between 0.3 to 3 hours, a molecular weight modifier selected from the mono or difunctional mercaptans of formula $R_1$—$(SH)_m$, wherein $R_1$ represents an alkyl radical, a cycloalkyl radical, a $C_1$–$C_{20}$ aromatic radical and m is an integer from 1 to 2 or of formula (SH—$R_2$—COO)$_n R_3$, where $R_2$ and $R_3$ represent a $C_1$–$C_{10}$ alkyl radical and n is an integer ranging from 1 to 4, and from 5 to 30% by weight of a polymerization adjuvant solvent selected from the group consisting of n-butylformate, n-butylacetate, isobutylacetate, tert.butylacetate, ethylpropionate, methylbutyrate, ethylbutyrate, and methylhexanoate;

(b) partially converting about 70 to 90% of the reaction mixture at about 120° C. to 160° C., and at a pressure ranging from the mixture vapor tension to 0.5 MPa;

(c) devolatilizing the partially converted polymer at about 200° to 250° C.;

(d) sending the devolatilized polymer in a molten state to a molding device or an extruding device; and (e) making a molded or extruded product having a transmittance greater than 92%, a haze less than 0.5% and a yellow index less than 2.5, the transmittance and haze being determined on 3 mm thick specimens according to A.S.T.M. D1003-61, and the yellow index being determined on 60 mm thick specimens according to A.S.T.M. D1925-70;

wherein during steps (a) to (c) the viscosity of the reaction mixture is maintained in a range to avoid self-acceleration.

7. The process of claim 6 wherein the pressure during step (c) is maintained at values ranging from atmospheric to $10^3$ Pa.

8. Optical fibers and optical instruments prepared for molding or extrusion of polymethylmethacrylate or of methylmethacrylate copolymer containing up to 25% by weight of $C_1$–$C_8$ alkyl ester of (meth)acrylic acid, prepared according to the process describe in claim 1.

9. Optical fibers and optical instruments according to claim 8, having the following optical properties:

Transmittance (ASTM D 1003-61); higher than 92% of 3 mm thick specimens;

Haze (ASTM D 1003-61); lower than 0.5% on 3 mm thick specimens;

Yellow index (ASTM D 1925-70); lower than 2.5 on 60 mm thick specimens.

* * * * *